US010476943B2

(12) United States Patent
Chen et al.

(10) Patent No.: US 10,476,943 B2
(45) Date of Patent: Nov. 12, 2019

(54) CUSTOMIZING MANIFEST FILE FOR ENHANCING MEDIA STREAMING

(71) Applicant: Facebook, Inc., Menlo Park, CA (US)

(72) Inventors: Minchuan Chen, Redmond, WA (US); Amit Puntambekar, Fremont, CA (US); Michael Hamilton Coward, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 118 days.

(21) Appl. No.: 15/395,764

(22) Filed: Dec. 30, 2016

(65) Prior Publication Data
US 2018/0191587 A1  Jul. 5, 2018

(51) Int. Cl.
*H04L 12/26* (2006.01)
*H04L 29/06* (2006.01)
*H04L 29/08* (2006.01)

(52) U.S. Cl.
CPC .......... *H04L 67/10* (2013.01); *H04L 65/4084* (2013.01); *H04L 65/602* (2013.01); *H04L 65/607* (2013.01); *H04L 65/608* (2013.01); *H04L 65/80* (2013.01)

(58) Field of Classification Search
CPC ..... H04L 43/062; H04L 67/10; H04L 65/608; H04L 67/02; H04L 65/80; H04L 65/607; H04L 65/4084; H04L 65/602
USPC ........................................................ 709/219
See application file for complete search history.

(56) References Cited

U.S. PATENT DOCUMENTS

| | | |
|---|---|---|
| 6,728,763 B1 * | 4/2004 | Chen ................. G06F 17/30902 370/316 |
| 8,677,005 B2 | 3/2014 | Wang et al. |
| 8,849,950 B2 | 9/2014 | Stockhammer et al. |
| 8,924,580 B2 | 12/2014 | Begen et al. |
| 9,015,335 B1 | 4/2015 | Gigliotti et al. |
| 9,338,209 B1 | 5/2016 | Begen et al. |
| 9,386,064 B2 | 7/2016 | Luby et al. |

(Continued)

OTHER PUBLICATIONS

Sodagar, I. et al., "The Mpeg-Dash Standard for Multimedia Streaming Over the Internet," *IEEE Multi Media*, 2011, vol. 4 pp. 62-67.

(Continued)

*Primary Examiner* — David R Lazaro
*Assistant Examiner* — Berhanu Shitayewoldetadik
(74) *Attorney, Agent, or Firm* — Fenwick & West LLP

(57) ABSTRACT

An online system more efficiently streams multimedia content over the Internet for play back on client devices with varying computing power and network bandwidths by generating enhanced manifest files that more efficiently identify suitable media representations of the multimedia content. Each media representation has multiple media segments according to predefined byte ranges and a manifest file, which identifies location of the media file, bitrates, resolution, byte range, total duration, and other metadata. The online system customizes a manifest file for a user based on various factors including device capacity, network connectivity type and geolocation of the user. The online system also generates manifest fetch commands, which more efficiently fetch media segments for streaming. In response to changes of streaming server and media file (e.g., increased popularity), the online system dynamically updates corresponding manifest files.

20 Claims, 11 Drawing Sheets

(56) References Cited

U.S. PATENT DOCUMENTS

| | | | | |
|---|---|---|---|---|
| 9,456,015 | B2* | 9/2016 | Chen | H04L 65/607 |
| 10,057,314 | B2* | 8/2018 | Navali | H04N 21/23439 |
| 2002/0140719 | A1* | 10/2002 | Amir | G06F 17/30017 |
| | | | | 715/716 |
| 2004/0128343 | A1* | 7/2004 | Mayer | H04L 29/06 |
| | | | | 709/203 |
| 2006/0230170 | A1* | 10/2006 | Chintala | H04N 7/17336 |
| | | | | 709/231 |
| 2007/0156589 | A1* | 7/2007 | Zimler | H04H 60/65 |
| | | | | 705/51 |
| 2007/0220036 | A1* | 9/2007 | Das | G06Q 10/00 |
| 2008/0140719 | A1* | 6/2008 | Chaney | H04L 51/24 |
| 2010/0046927 | A1* | 2/2010 | Manthoulis | H04N 21/2181 |
| | | | | 386/241 |
| 2010/0235472 | A1* | 9/2010 | Sood | H04L 65/4092 |
| | | | | 709/219 |
| 2011/0060998 | A1* | 3/2011 | Schwartz | G06F 17/30873 |
| | | | | 715/738 |
| 2011/0096828 | A1* | 4/2011 | Chen | H04N 21/23106 |
| | | | | 375/240.02 |
| 2013/0007814 | A1* | 1/2013 | Cherian | H04L 65/605 |
| | | | | 725/62 |
| 2013/0080268 | A1* | 3/2013 | Gordon | G06Q 30/02 |
| | | | | 705/14.73 |
| 2013/0080579 | A1* | 3/2013 | Gordon | H04L 65/608 |
| | | | | 709/217 |
| 2013/0290698 | A1* | 10/2013 | Giladi | H04N 21/26258 |
| | | | | 713/150 |
| 2013/0291002 | A1* | 10/2013 | Rothschild | H04N 21/258 |
| | | | | 725/25 |
| 2013/0311670 | A1* | 11/2013 | Tarbox | H04N 21/2387 |
| | | | | 709/231 |
| 2014/0095730 | A1* | 4/2014 | Ozgur | H04W 4/70 |
| | | | | 709/231 |
| 2014/0095890 | A1* | 4/2014 | Mangalore | G06F 21/10 |
| | | | | 713/189 |
| 2014/0201335 | A1* | 7/2014 | Wang | H04L 65/4092 |
| | | | | 709/219 |
| 2014/0250230 | A1* | 9/2014 | Brueck | H04L 65/607 |
| | | | | 709/226 |
| 2014/0317308 | A1* | 10/2014 | Zhang | H04L 65/4069 |
| | | | | 709/231 |
| 2014/0379871 | A1 | 12/2014 | Van Brandenburg et al. | |
| 2015/0172066 | A1 | 6/2015 | Gholmieh et al. | |
| 2015/0172340 | A1 | 6/2015 | Lohmar et al. | |
| 2015/0312303 | A1 | 10/2015 | Krishna et al. | |
| 2015/0365450 | A1* | 12/2015 | Gaunt | H04L 65/4084 |
| | | | | 709/231 |
| 2016/0006817 | A1* | 1/2016 | Mitic | H04L 65/4076 |
| | | | | 709/232 |
| 2016/0041998 | A1* | 2/2016 | Hall | G06F 16/738 |
| | | | | 707/725 |
| 2016/0134673 | A1* | 5/2016 | MacInnis | H04L 65/60 |
| | | | | 709/231 |
| 2016/0234536 | A1 | 8/2016 | Stockhammer et al. | |
| 2016/0337424 | A1 | 11/2016 | Mandyam | |
| 2016/0337426 | A1 | 11/2016 | Shribman et al. | |
| 2016/0337680 | A1* | 11/2016 | Kalagi | H04N 21/2662 |
| 2016/0366488 | A1 | 12/2016 | Long | |
| 2017/0055007 | A1 | 2/2017 | Phillips | |
| 2017/0085950 | A1 | 3/2017 | Halepovic | |
| 2017/0171287 | A1 | 6/2017 | Famaey | |
| 2018/0034880 | A1 | 2/2018 | Choi | |
| 2018/0242028 | A1* | 8/2018 | Van Brandenburg | H04N 21/23439 |

OTHER PUBLICATIONS

Van Lancker, W. et al., "HTTP Adaptive Streaming with Media Fragment URIS." *2011 IEEE International Conference on Multimedia and Expo* (ICME), 2011, six pages.

Van Lancker, W. et al., "Implementation Strategies for Efficient Media Fragment Retrieval," *Multimedia Tools and Application*, 2012, vol. 57, pp. 243-267.

\* cited by examiner

CUSTOMIZING MANIFEST FILE FOR ENHANCING MEDIA STREAMING

BACKGROUND

This disclosure generally relates to online digital content streaming, and particularly to an adaptive streaming system that generates enhanced media manifest files for identifying and streaming a live or on-demand media file (e.g., a video file) representations with various video qualities to clients having varying delivery bandwidth and computing processing power.

An online system allows its users to connect to and communicate with other online system users. For example, an online system allows a user to encode media files, such as images or videos, and share the media files with other online system users. An online system user may also request to view media files (e.g., stream a video on demand) encoded by the online system user, or by other online system users, encouraging user engagement with the online system. However, this user engagement is decreased with increased platform latency as online system users attempt to stream a media file outside of available bandwidth or view a popular media file.

To enable adaptive streaming of multimedia content over HTTP, when an input media file (e.g., a video) is encoded, multiple levels of compression can be applied to the input file producing a plurality of compressed versions (e.g., resolution of 360p, 480p, 720p, 1080p, etc.), or "representations," of the input file for streaming on a client device. This allows an online system user to select the representation of a media file for streaming that is within the online system user's available bandwidth. However, if the online system user attempts to stream a media file at a representation that requires greater bandwidth than a client device or network connection will allow, the online system user experiences platform latency.

Existing solutions of adaptive streaming over HTPP divide a media file into segments according to a fixed duration (e.g., 10 second segments) and cache links to these segments (e.g., universal resource locators (URLs)) across computer servers within a given content delivery network (CDN). Each URL containing a segment of the media file is listed on the manifest file of its corresponding media file, in addition to the segment's start points and end points. This allows an online system user to dynamically switch between representations to accommodate available bandwidth. However, creating a manifest file entry for each segment of a media file causes its manifest file to increase in size. Increased manifest file size complicates file administration and decreases manifest file storage efficiency for streaming service, especially live video streaming. In addition, larger manifest files increase platform latency as the manifest file must be downloaded to a client device before the media file may be streamed by an online system user.

The latency for fetching the proper media file and/or segments can be compounded by network congestion due to user traffic directed to popular media within a CDN. When a computer server within a CDN has a popular (e.g., trending) media, it is very likely that a large number of user requests for the popular media will be directed to the computer server. This can cause a delay in the delivery of various representations of a requested media file and delay stream traffic.

Furthermore, for existing solutions, the delay in stream traffic is due, in part, to the initialization process that a streaming system must complete before a client device can commence streaming a media file, such as properly initializing a manifest file associated with a representation of a media file. For example, a manifest file associated with a representation of a media file generally contains information describing an initialization segment (init), which contains data that does not change between segments, a segment index (sidx), which describes byte ranges within a segment, and media segment information. However, using (init+sidx) format in a manifest file to guide a client device on the amount of data to fetch from a storage device is inefficient as it requires the client device to perform a series of fetches in order to locate the first segment of the media file.

SUMMARY

A solution is provided to more efficiently stream multimedia content over the Internet for playback on client devices having varying computing power and network bandwidth by generating enhanced manifest files that identify suitable media representations of the multimedia content. A streaming system can produce multiple instances of a live or on-demand media file (e.g., a video file) with various video qualities and provide them to client devices having varying delivery bandwidth and CPU processing power. For example, responsive to an input file being uploaded to the streaming system, a decision engine of the system produces multiple representations of the input file: low-definition (LD) representation, medium-definition (MD) representation, high-definition (HD) representation, and any other suitable representations of varying qualities. Different representations of the same content encoded in different qualities enable a client device to request the highest quality content that it can play without waiting to buffer and without wasting bandwidth on unneeded pixels (e.g., a 4 K content for a 720p TV). Each representation of the input file has a media presentation description (MPD) file, referred to herein as "manifest file," which identifies various components of the representation of the media file such as location of the representation of the media file, bitrates, resolution, byte range, total duration, and the like. For simplicity, the solution for enhancing dynamic adaptive streaming over HTTP service is described with respect to dynamic adaptive streaming over HTTP (DASH) protocol. However, the solution can also be applied to other adaptive streaming protocols, such as HTTP Living Streaming (HLS) protocol and Smooth Streaming protocol.

The streaming system customizes a manifest file associated with a representation of the input file for a user associated with a device based on various factors including device capacity (e.g., bandwidth), network connectivity type (e.g., cell/wifi/2G) and geolocation of the user (e.g., India) based, for example, on the device. To enhance user experience with the streaming service provided by the online system, the manifest file can be customized for a target user, e.g., selecting a suitable media representation of a video for streaming to a device associated with the target user such that the target user gets the best quality video quality given the target user's device location, network bandwidth and computing. In one embodiment, a decision engine uses a model trained by a machine learning module to determine which quality of the media file to stream for the target user. When the target user requests the online system to stream a media file, the decision engine uses the trained model to collect data about the target user including: client device type, network connectivity type, and geolocation of the target user. The decision engine selects a representation of the requested video such that the target user will most likely have the best quality stream using the selected representation of the requested video (e.g., in comparison to other possible representations of the requested video).

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
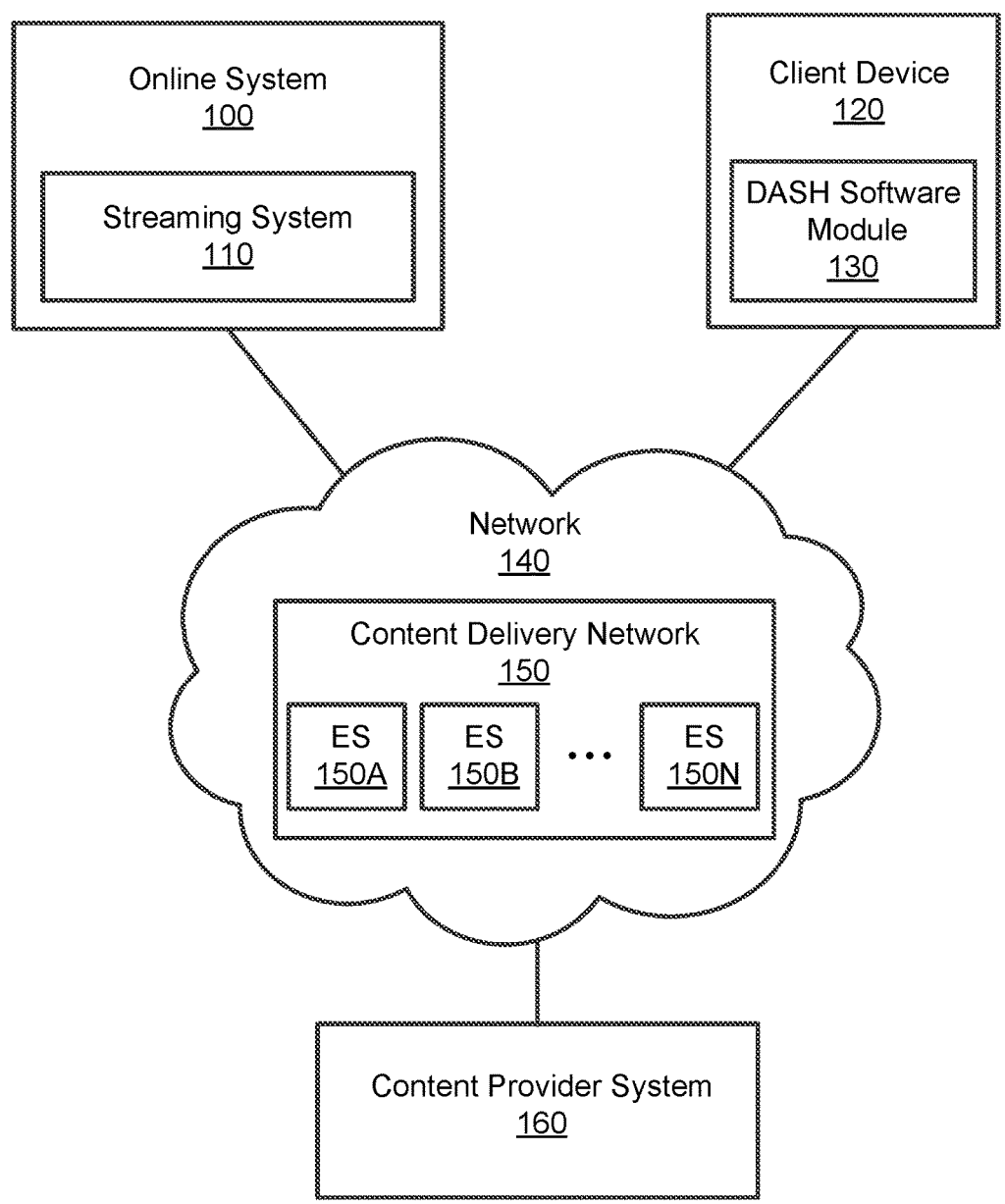
FIG. 1 is a block diagram of a system environment for providing enhanced dynamic adaptive streaming over HTTP (DASH) service according to one embodiment.

FIG. 1 is a block diagram of a system environment for providing multiple instances of a live or on-demand media file (e.g., a video file) to clients having varying delivery bandwidth and CPU processing power according to one embodiment. The system environment includes an online system 100, a client device 120, and a content provider system 160 connected to each other over a network 140. In other embodiments, different and/or additional entities can be included in the system architecture.

The client device 120 is a computing device capable of receiving user input as well as transmitting and/or receiving data via the network 140. In one embodiment, a client device 120 is a conventional computer system, such as a desktop or laptop computer. Alternatively, a client device 120 may be a device having computer functionality, such as a personal digital assistant (PDA), a mobile telephone, a smartphone or another suitable device. A client device 120 is configured to communicate via the network 140. In one embodiment, a client device 120 executes an application allowing a user of the client device 120 to interact with the online system 100. For example, a client device 120 executes a browser application to enable interaction between the client device 120 and the online system 100 via the network 140. In another embodiment, a client device 120 interacts with the online system 100 through an application programming interface (API) running on a native operating system of the client device 120, such as IOS® or ANDROID™. In the embodiment shown in FIG. 1, the client device 120 has a DASH software module 130 that can send video content requests to a streaming system 110, download/playback requested video content, monitor download bitrate of requested video content, and report download bitrate to the streaming system 110 (further discussed in Section IV: DASH Software Module).

The content provider system 160 is used by content providers for interacting with the online system 100. In one embodiment, a content provider system 160 is an application provider communicating information describing applications for execution by a client device 120 or communicating data to client devices 120 for use by an application executing on the client device 120. In other embodiments, a content provider system 160 provides content, e.g., streaming media, or other information for presentation via a client device 120. For example, the content provider system 160 provides a third party website that communicates information to the online system 100, such as sponsored content or information about an application provided by the content provider. The sponsored content may be created by the entity that owns the content provider system 160. Such an entity may be a company (e.g., a third party outside of the online system 100) offering a product, service, or message that the company wishes to promote.

The online system 100 includes a computing environment that allows users of the online system 100 to communicate or otherwise interact with each other and access content. The online system 100 stores information about the users, for example, user profile information and information about actions performed by users on the online system 100. In one embodiment, the online system 100 includes a streaming system 110. The streaming system 110 (further described with reference to FIG. 2 in Section II. Streaming System) provides the DASH software module 120 with enhanced manifest files that efficiently identify alternative media streams and their respective URLs.

The network 140 includes any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 180 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

In one embodiment, the network 140 contains a content delivery network (CDN) 150. CDN 150 is a scalable system of distributed computer servers, such as edge servers, ES 150A through ES 150N, that delivers content to a target user based on: the geographic location of the target user, the origin of the requested content, and the traffic load placed on individual edge servers within the CDN 150. In one embodiment, the CDN 150 receives content from a source (e.g., content provider system 160), encodes a plurality of representations of the content at different levels of compression and file sizes, and stores representations across its network of edge servers. The streaming system 110, such as that shown in FIG. 3B, creates manifest files for each representation of the distributed media file to be used by a media player on a client device 120 for streaming. In another embodiment, shown in FIG. 3A, the streaming system 110 receives an input file 300, encodes the input file 300, segments the encoded input file into multiple segments, creates a manifest file to describe attributes of a media representation of the media file, and stores representations of the input file 300 across edge servers comprising the CDN 150.

II. Online System

Figure 2:
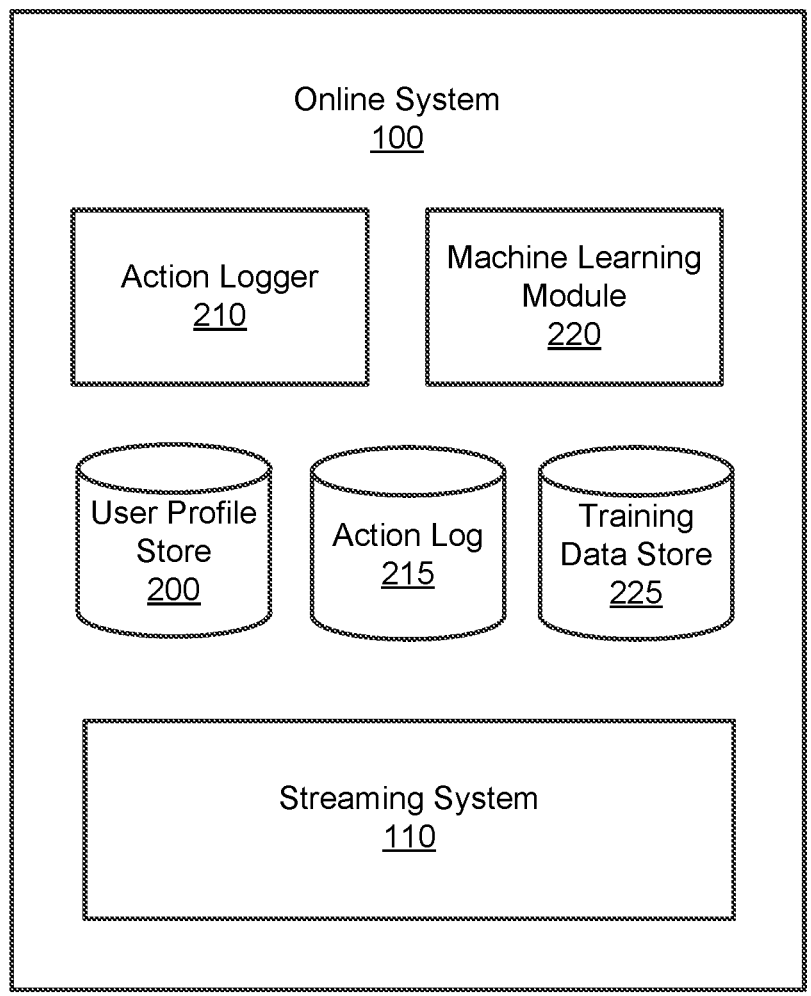
FIG. 2 is a block diagram of an online system having a streaming system for providing DASH service according to one embodiment.

FIG. 2 is a block diagram of an online system 100 with a streaming system 110 according to one embodiment. In the embodiment illustrated in FIG. 2, the online system 100 includes a user profile store 200, action logger 210, action log 215, machine learning module 220, training data store 225, and a streaming system 110. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

Each user of the online system 100 is associated with a user profile, which is stored in the user profile store 200. A user profile includes declarative information about the user that was explicitly shared by the user and may also include profile information inferred by the online system 100. In one embodiment, a user profile store 200 of an online system user includes multiple data fields, each describing one or more attributes of the user. Examples of information stored in a user profile store 200 include biographic, demographic, and other types of descriptive information, such as work experience, educational history, gender, hobbies or preferences, location and the like. A user profile may also store other information provided by the user, for example, images or videos. In certain embodiments, an image of a user may be tagged with information identifying the online system user displayed in an image. A user profile in the user profile store 200 may also maintain references to actions by the corresponding user performed on content items in the action log 215.

While user profiles in the user profile store 200 are frequently associated with individuals, allowing individuals to interact with each other via the online system 100, user profiles may also be stored for entities such as businesses or organizations. This allows an entity to establish a presence on the online system 100 for connecting and exchanging content with other online system 100 users. The entity may post information about itself, about its products or provide other information to users of the online system 100 using a brand page associated with the entity's user profile. Other users of the online system 100 may connect to the brand page to receive information posted to the brand page or to receive information from the brand page. A user profile associated with the brand page may include information about the entity itself, providing users with background or informational data about the entity.

The action logger 210 receives communications about user actions internal to and/or external to the online system 100, populating the action log 215 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 215.

The action log 215 may be used by the online system 100 to track user actions on the online system 100, as well as actions on third party systems that communicate information to the online system 100. Users may interact with various objects on the online system 100, and information describing these interactions is stored in the action log 215. Examples of interactions with objects include: viewing videos, commenting on posts, sharing links, checking-in to physical locations via a mobile device, accessing content items, and any other suitable interactions. Additional examples of interactions with objects on the online system 100 that are included in the action log 215 include: viewing videos posted by a user's connections in the online system 100, commenting on a photo album, communicating with a user, establishing a connection with an object, joining an event, joining a group, creating an event, authorizing an application, using an application, expressing a preference for an object ("liking" the object), and engaging in a transaction. Additionally, the action log 215 may record a user's interactions with sponsored content on the online system 100 as well as with other applications operating on the online system 100. In some embodiments, data from the action log 215 is used to infer interests or preferences of a user, augmenting the interests included in the user's user profile store 200 and allowing a more complete understanding of user preferences.

The action log 215 may also store user actions taken on a third party system, such as an external website, and communicated to the online system 100. For example, an e-commerce website may recognize a user of an online system 100 through a social plug-in enabling the e-commerce website to identify the user of the online system 100. Because users of the online system 100 are uniquely identifiable, e-commerce websites, such as in the preceding example, may communicate information about a user's actions outside of the online system 100 to the online system 100 for association with the user. Hence, the action log 215 may record information about actions users perform on a third party system, including webpage viewing histories, sponsored content that were engaged, purchases made, and other patterns from shopping and buying.

The machine learning module 220 trains one or more machine learning models for the streaming system 110 using training data from the training data store 225, where the streaming system 110 uses a trained model to select a suitable media representation of a media file for a target user based on various features associated with the target user. For example, the machine learning module 220 uses one or more machine learning algorithms such as neural networks, naïve Bayes, and support vector machines with training data from the training data store 225 to train the models. To train a model for the streaming system, the machine learning module 220 extracts information about users in the training data set from each user's action log 215 and user profile store 200. This information is stored in the training data store 225 and is used to develop a machine learning model that provides a target user with customized streaming features for requested media files at runtime. For example, to customize playback options for a requested media file for a target user, the streaming system 110 provides the target user with "best" streaming settings predicted by a trained model based on the user's viewing history and geolocation.

III. Streaming System

Figure 3A:
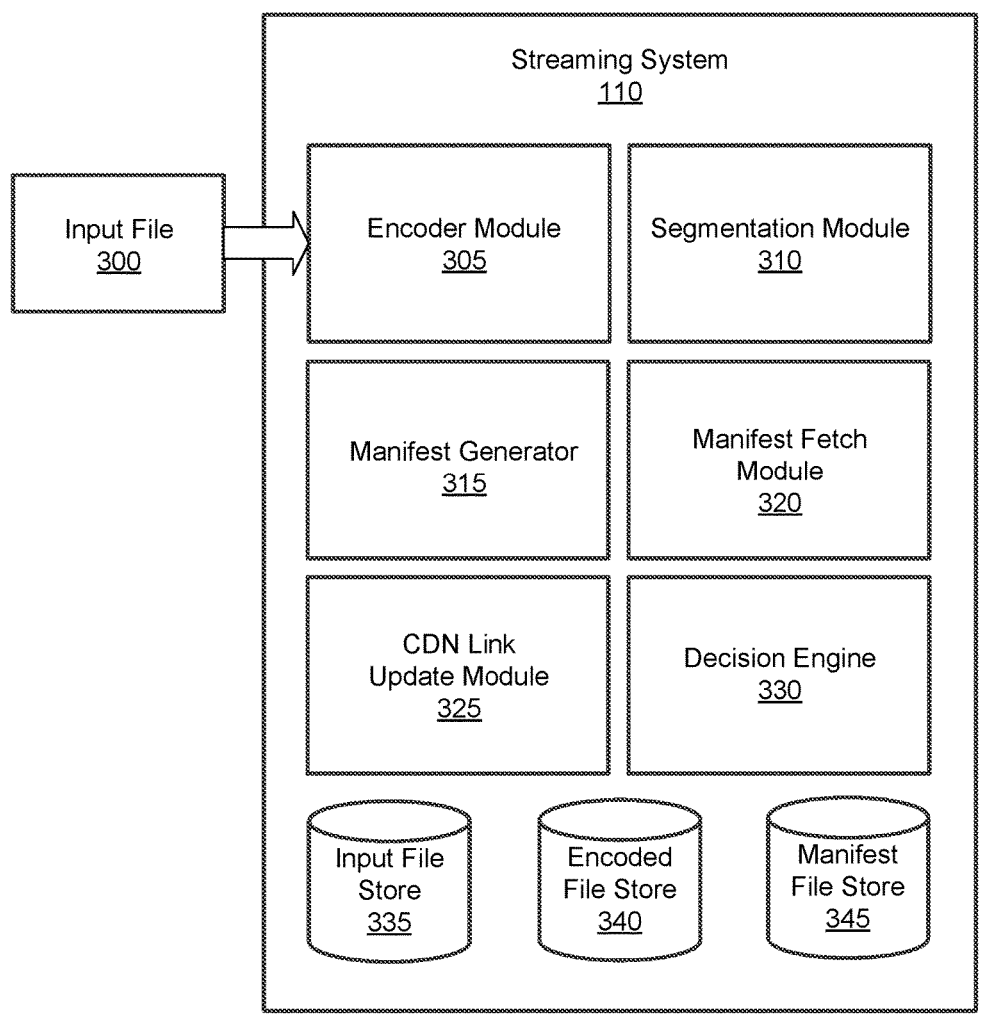
FIG. 3A shows a streaming system according to one embodiment.
Figure 3B:
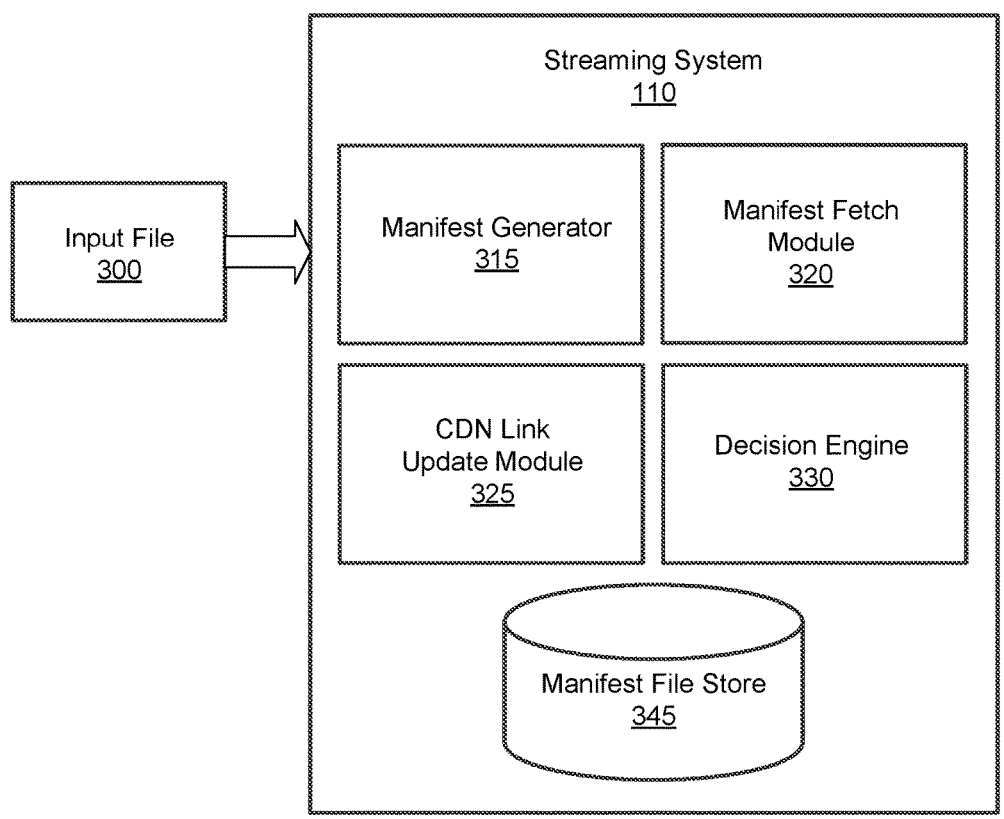
FIG. 3B shows a streaming system according to another embodiment.

FIG. 3A is a block diagram of a streaming system 110 according to one embodiment. In the embodiment illustrated in FIG. 3A, the streaming system 110 is a media streaming system that includes an encoder module 305, segmentation module 310, manifest generator 315, manifest fetch module 320, CDN link update module 325, decision engine 330, input file store 335, encoded file store 340, and manifest file store 345. In this embodiment, the streaming system 110 encodes input files 300 supplied by one or more content providers, such as online system 100 users, generates manifest files associated with each input file 300, provides the generated manifest files including instructions to the CDN 150 on how to efficiently fetch instructions in each manifest file, and updates manifest files based on load balancing among computer servers within the CDN 150.

The encoder module 305 encodes the input file 300 into one or more compressed representations: low-definition (LD), medium-definition (MD), high-definition (HD), and any other suitable representations of varying qualities. A LD representation of the input file 300 represents a low quality version of the input file 300; a MD representation of the input file 300 represents a medium quality version of the input file 300; and HD representation of the input file 300 represents a high quality version of the input file 300. The quality of the input file 300 can be described by various standards, such as bitrate, frame rate, peak signal to noise ratio (PSNR), and resolution. Different representations of same content encoded in different qualities enable client devices to request the highest quality content that they can play without waiting to buffer and without wasting bandwidth on unneeded pixels (e.g., a 4K content for a 720p TV). These representations of the input file 300 are stored in the encoded file store 340; the original input file 300 is stored in the input file store 335. In one embodiment, the encoder module 305 indiscriminately encodes all representations (e.g., LD, MD, and HD) for each input file 300, regardless of its source or computing power or bandwidth of receiving client devices. In response to a request for streaming the input file 300, a decision is made by the decision engine 330 on which representation of the input file 300 is used for the streaming. In another embodiment, the encoder module 305 first generates an LD representation of the input file 300 by default such that every input file 300 will have, at least, an LD representation. Additional representations of the input file 300 (e.g., MD and HD) are made based on information (e.g., reputation of the source of the content, popularity of the input file 300, geolocation of the requesting client device) collected by the decision engine 330.

Figure 4A:
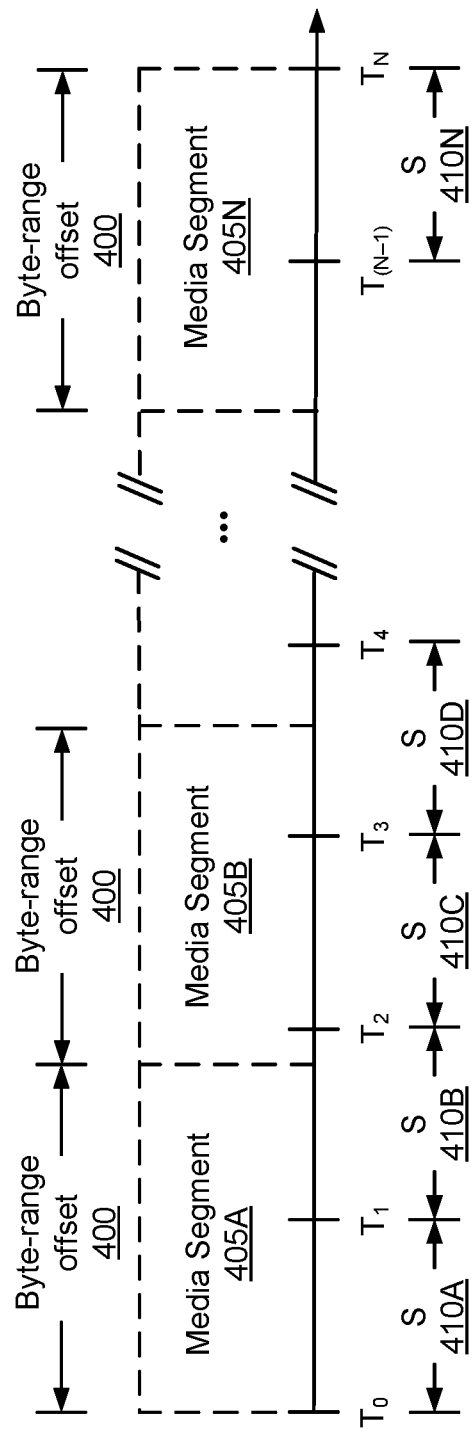
FIG. 4A illustrates a segmentation module according to one embodiment.

The segmentation module 310 divides a representation of the input file 300 into multiple small sized media segments. Each segment of a representation of the input file 300 has multiple video frames (and audio frames) of the input file 300, and each segment corresponds to a portion of the input file 300. In one embodiment, the segmentation module 310 divides a representation of the input file 300 by a fix-sized byte range, e.g., 100 KB per segment, and describes the segments of the representation as byte ranges within a single media file. FIG. 4A shows a media file that represents a representation of an input file is partitioned into a plurality of media segments 405A-405N. Byte-range offset 400 is an adjustable threshold used to describe the media file as segments of a fixed file size (e.g. 100 KB per segment). By describing segments of a representation of a media file in terms of byte range rather than describing each separate segment in terms of other segmenting standards, such as duration of each segment (e.g., 405A-405N shown in FIG. 4A), the segmentation module 310 reduces the number of URL entries in the manifest file describing the segments of the representation.

Figure 4B:
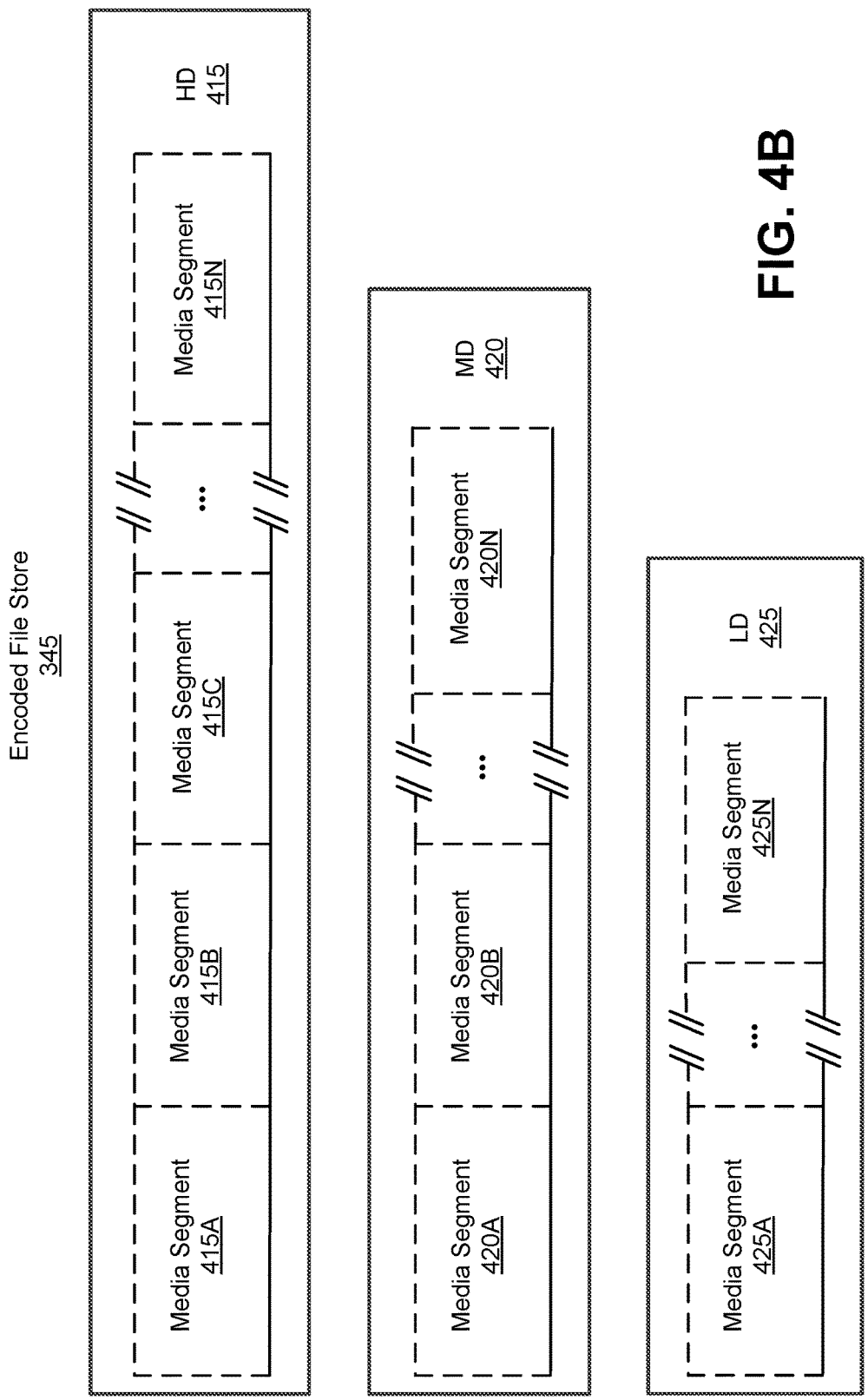
FIG. 4B shows an example of segments of different representations of a media file according to one embodiment.

FIG. 4B illustrates an example of segmentation of corresponding HD 415, MD 420, and LD 425 media files of an input file. Although the file size of each representation is different as a result of compression, the byte-range offset 400 used to describe each segment of each representation is same, e.g., 100K bytes per segment. For example, although the HD 415 representation of the input file 300 is larger than the MD 420 representation, media segment 415A and media segment 420A are the same size (e.g., 100 KB). This allows the streaming system 110 to stream seamlessly across a plurality of representations of a requested media file.

Referring back to FIG. 3A, the manifest generator 315 generates a manifest file for each media file in the online system 100 for streaming to a target audience. In one embodiment, the manifest file for a media file, e.g., the input file 300, includes information describing the location of the input file 300, e.g., a URL identifying the location at an edge server in a CDN for downloading the input file 300 by a client device. If a media file is encoded into multiple representations, e.g., LD, MD and HD, the manifest file for the media file can include additional information, e.g., identifier and location of each representation, bitrate, resolution, byte-range of segments, and total duration. In another embodiment, each representation of the media file has a corresponding manifest file, which includes information identifying the quality of the representation, URL of the base file (i.e., the URL of the media file), byte range of segments, number of segments, etc. Manifest files are stored in the manifest file store 345, and are used to locate and stream media files. In another embodiment, if a media file is encoded into multiple representations, e.g., LD, MD and HD, the manifest generator 315 generates manifest files for all representations of each input file 300. For an example of this embodiment, each representation of the media file has a corresponding manifest file, which includes information identifying the quality of the representation, URL of the base file (i.e., the URL of the media file), byte range of segments, number of segments, etc.

To enhance user experience with the streaming service provided by the online system 100, the manifest file can be customized for a target user, e.g., selecting a suitable media representation of a video for streaming to the target user such that the target user gets the best quality video quality given the target user's geolocation, network bandwidth and computing power of a client device used by the target user to download the video. In one embodiment, decision engine 330 uses a model trained by the machine learning module 220 to determine at which quality the media file will stream for the target user. When the target user requests the streaming system 110 to stream a media file, the decision engine 330 uses the trained model to collect data about the target user including: client device 120 (e.g., player capacity), network connectivity type (e.g., cell/Wi-Fi/2G) and geolocation of the target user. The decision engine 330 selects a representation of the requested video such that the target user will most likely use to have best quality stream service using the selected representation of the requested video. All users of the streaming system 110 have at least, an LD representation of the original input file 300 by default to begin streaming, but users can dynamically switch to other representations based on network conditions and client device 120 bandwidth associated with each user. This allows users to request the highest representation quality available for playback without waiting to buffer and without wasting bandwidth on unneeded pixels (e.g., 1080p content not needed on 720p device).

In one embodiment, the decision engine 330 extracts a target user's IP address (e.g., from the action log 215) and the representation quality at which a requested media file is streaming (e.g., LD, MD, or HD). The target user's geolocation data is derived from the IP address and is used in tandem with representation quality information as input to the trained model to predict the most likely representation quality to be used in a given region where the target user is located. The manifest generator 315 uses this quality prediction model to customize a manifest file that includes only those streaming options available to a user within that region. For example, an online system 100 user located in South Korea will be presented with a plurality of representation options for streaming (e.g., LD, MD, and HD) due to the high bandwidth available in the region. Conversely, a user in a particular region of India might be presented with only default (e.g., LD) representation quality due to the region's poor bandwidth. In another embodiment, the decision engine 330 uses the trained model to extract a target user's identification information (e.g., from the user profile store 200) and representation quality to select a suitable representation of requested video based on individual users of the online system 100. For example, if a target user frequently streams media files at MD representation quality due to device capabilities, the decision engine 330 uses the trained model to associates the target user with MD streaming quality. Based on this association, the manifest generator 315 creates a manifest file for the target user that prioritizes MD representation quality.

The CDN link update module 325 proactively selects one or more edge server(s) (e.g., ES 150A through ES 150N) to cache a requested media file in the event that the media file becomes popular within the online system 100 or if an edge server within the CDN malfunctions (e.g., slower response to streaming requests due to large increase of work load). The streaming system 110 considers various factors in determining to which edge server within CDN 150 a streaming request should be redirected and updates the manifest file corresponding to the request to reflect the redirection, including: locality of the edge server to a user requesting the media file, loads placed upon each edge server, and the storage capacity of each edge server. In one embodiment, the CDN link update module 325 constantly monitors the status of the CDN, such as traffic load of each edge server, number requests for each media file stored in an edge server, and periodically generated as CDN data. In response to a threshold number of updates being observed from the CDN data, e.g., a large number of requests for a popular video stored in a particular edge server, the CDN link update module 325 locates one or more alternate edge servers to host representations of the popular media file. In order to perform load balancing across edge servers, the CDN considers the proximity of an edge server to an online system user that requested the popular media file (e.g., locality) and load placed on each edge server (e.g., busyness) within the CDN.

When a selection is made, the CDN link update module 325 caches representations of the popular media file in the selected edge server(s) and instructs the manifest generator 315 to updates the manifest file associated with each representation to reflect its new location (e.g., URL).

The manifest fetch module 320 generates commands on how to fetch segments of a representation of a media file through the corresponding manifest files for requested media file. As described above, a representation of a media file includes multiple segments, each of which is located within the representation of the media file in terms of byte range with respect to a first segment. Traditional fetch commands often require multiple fetches for a requested segment, e.g., one fetch for initialization defined by a pair of start/end parameters and another fetch for the requested segment defined by another pair of start/end parameters, and have to record the index for the initiation (i.e., init) and segmentation index (i.e., sidx) for each segment in the manifest file. The enhanced manifest file for a representation generated by the online system 100 enables the segment fetch with improved efficiency. For example, each fetch command is simplified to indicate the number of the fetch, e.g. a first-data-fetch, a second-data-fetch, and byte size of each fetch, which is one or more fix-sized byte ranges (e.g., 100K bytes, 200K bytes). In addition, the manifest fetch module 320 dynamically maintains record of which media segment is currently being downloaded and which is next to stream by tracking the number of bytes that are currently being fetched.

When a target user requests to stream a media file, the manifest fetch module 320 first locates the manifest files associated with the requested media file and provides the LD version to a media player in the DASH software module 130 installed on the target user's client device 120. This LD version is provided to the target user by default to minimize latency due to buffering as a media download module on the client device downloads the first media segment of the requested media file to the client device 120. In addition to supplying the media player with manifest files, the manifest fetch module 320 keeps record of which media segment is currently being downloaded by the media download module, which media segment will be required next, and at what representation it will be streamed. The manifest fetch module 320 receives a signal from the decision engine 330 indicating the representation quality (e.g., LD, MD, or HD) that the target user is capable of streaming, and dynamically switches to the suitable representation of the requested video according to the received signal.

IV. DASH Software Module

Figure 5:
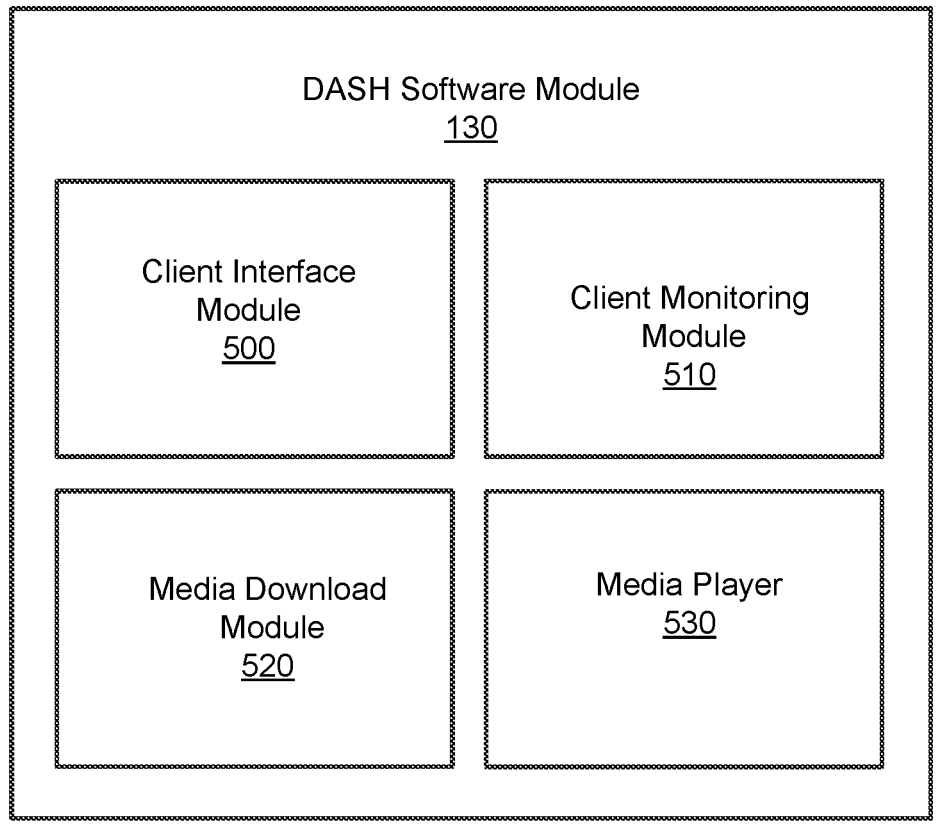
FIG. 5 is a block diagram of a DASH software module according to one embodiment.

FIG. 5 is a block diagram of the DASH software module 130 executing on a client device 120 according to one embodiment. In the embodiment illustrated in FIG. 5, the DASH software module 130 includes a client interface module 500, a client monitoring module 510, a media download module 520, and a media player 530. The DASH software module 130 provides the streaming system 110 with information regarding client device 120 bandwidth (e.g., 5 Mb/s); the streaming system 110 provides the DASH software module 130 with a manifest file used to stream media within the reported bandwidth (e.g., HD quality).

The client interface module 500 receives input from the streaming system 110 and provides the received input to the DASH software module 130 for further processing. Online system 100 users use the client interface module 500 to make a media file request that is provided to the decision engine 330 in the steaming system 110 for further processing.

The client monitoring module 510 monitors bandwidth capabilities on the client device 120, and reports these bandwidth capabilities to the decision engine 330. The decision engine 330 uses this information to discern the appropriate manifest file (e.g., manifest file for LD, MD, or HD representations) to stream a requested media file within the reported client device 120 bandwidth. By reporting changes in a target user's bandwidth, the streaming system 110 provides the highest streaming quality available to the target user for each segment of a requested media file. This is described in more detail in an example use case in Section V: Streaming Process.

The media download module 520 downloads media files for streaming on a client device 120. The manifest fetch module 320 provides the media download module 520 with a manifest file corresponding to a requested media file for streaming within the client device 120 bandwidth. In one embodiment, the manifest file directs the media download module 520 to the location of a requested media file within the encoded file store 340, shown in FIG. 3A. In another embodiment, the manifest file points to edge server URLs (e.g., ES 150A through ES 150N) within the CDN 150 that contain the requested media file. In both of these embodiments, the media download module 520 locates and downloads each byte-range segment of a requested media file.

The media player 530 plays back requested media files on a client device 120. Once the appropriate byte range of a media file has been located and downloaded by the media download module 520, the downloaded media file is streamed on the media player 530. The media player 530 may contain a user interface that allows an online system 100 user to manually select at which representation the online system 100 user would like to stream. However, if this selection is for a representation that exceeds the bandwidth capabilities of the online system 100 user's client device 120, platform latency will cause the media player 530 to buffer as the media download module 520 downloads the next byte range of the media file.

V. Streaming Process

Figure 6:
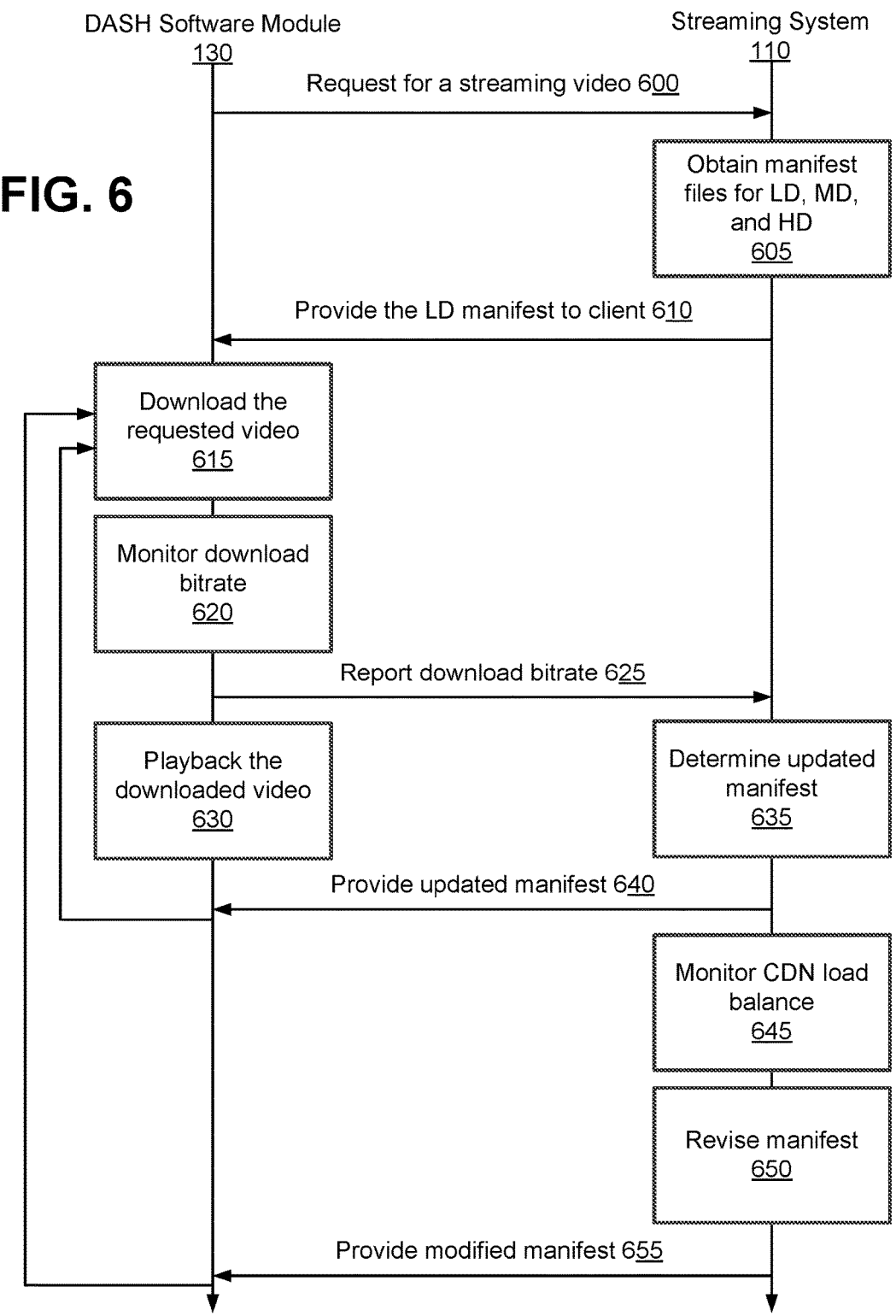
FIG. 6 is an interaction chart illustrating the interactions between a DASH software module on a client device and a streaming system according to one embodiment.

FIG. 6 illustrates the interaction between the DASH software module 130 of a client device 120 and the streaming system 110 in one embodiment. In this embodiment, the DASH software module 130 on a target user's client device 120 sends to the streaming system 110 a request 600 to stream a media file (e.g., video). The streaming system 110 receives this request and obtains 605 manifest files for LD, MD, and HD representations of the requested video from the manifest file store 345. The streaming system then provides 610 the DASH software module 130 with the manifest file pertaining to LD representation quality by default. The media download module 520 uses this manifest file to download 615 the requested video; the client monitoring module 510 monitors 620 the download bitrate while the download is in progress. The client monitoring module 510 reports 625 this download bitrate, via the client interface module 500, to the streaming system 110 where it is received by the decision engine 330. The decision engine 330 uses download bitrate information and a trained quality prediction model to determine 635 which manifest file will be used for the next segment of the requested video while the media player 530 begins playback 630 of the current segment. If the target user's bandwidth is capable of streaming the representation quality suggested by the quality prediction model, and the target user has not requested a higher quality from the media player 530, the decision engine 330 sends a signal to the manifest fetch module 320 indicating which manifest file to retrieve from the manifest file store 345. The manifest fetch module 320 then provides 640 this updated manifest file to the DASH software module 130 where it is used to download 615 the next segment of the requested video; this process repeats until the requested video has ended or there is a change (e.g., congestion) in network conditions. The streaming system 110 monitors 645 individual loads placed on edge servers, ES 150A through ES 150N, within the CDN 150. If it detects an increasing load placed on any particular edge servers (e.g., due to user traffic, server capacity, CDN malfunction, and the like) it signals the CDN link update module 325 to initiate load balancing amongst edge servers. The CDN link update module 325 selects the next edge server to host the requested video, and reports the server's URL to the manifest generator 315 where the corresponding manifest file is revised 650 to reflect the video's new location. The manifest fetch module 320 provides 655 the modified manifest file to the media download module 520 where it is used to download 615 the requested video and the overall process repeats until the conclusion of the video. This streaming process is further illustrated in FIG. 8B.

Figure 7:
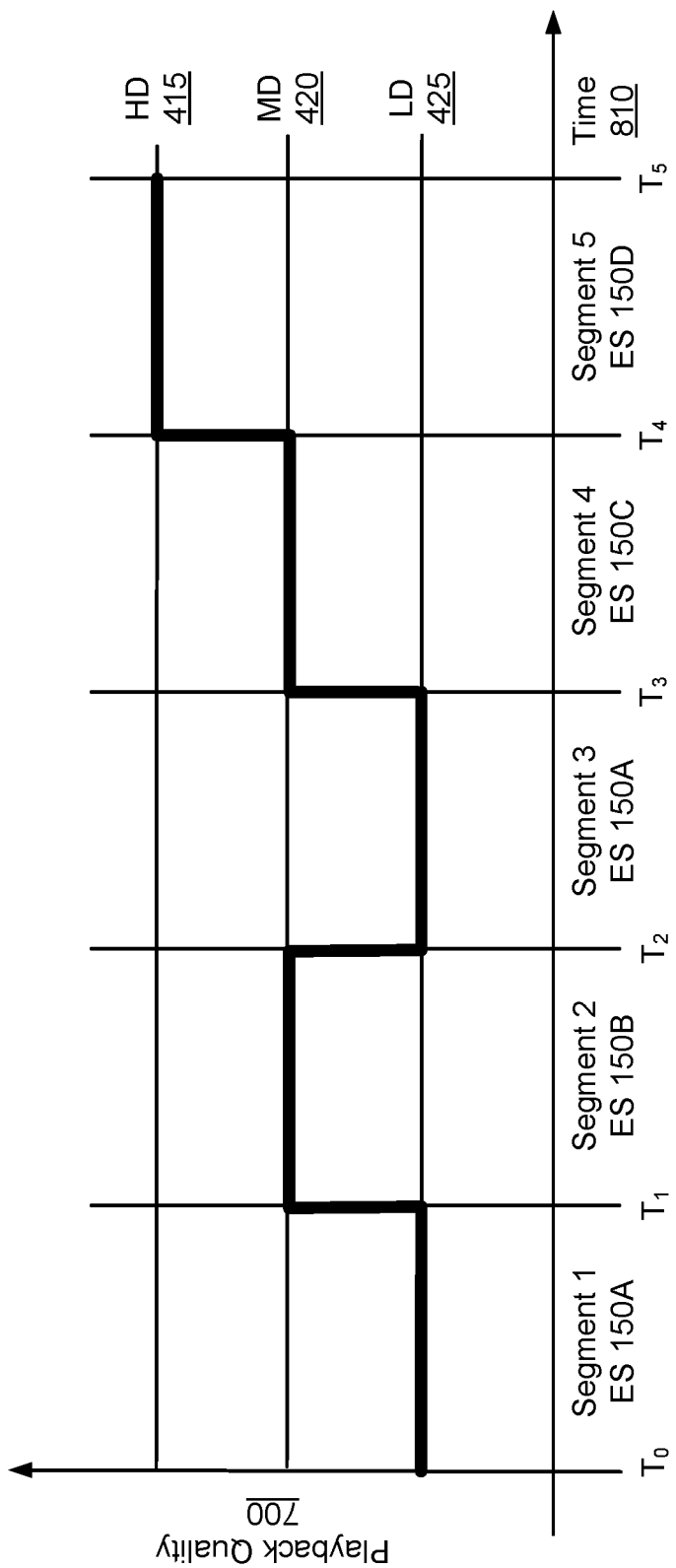
FIG. 7 shows an example of changes in video playback quality among multiple segments of a video according to one embodiment.

FIG. 7 illustrates an example use case in which a target user requests to stream a video on coverage of the 2016 Presidential Debate. The streaming system 110 begins streaming segment 1 at LD 425 playback quality 700 by default between times $T_0$ and $T_1$ from host ES 150A. The decision engine 330 identifies the target user, and uses the trained the quality prediction model to make a recommendation for HD 415 playback quality 700. However, the client monitoring module 510 reports the target user's bandwidth to be only 400 Kb/s. The decision engine 330 determines that, although the target user frequently streams requested media files in HD 415, this reported bandwidth is too low to support the recommendation made by the quality prediction model. Rather, the decision engine 330 supplies the DASH software module 130 with a manifest file for MD 420 streaming from ES 150B, where the MD 420 representation is hosted. This is illustrated in FIG. 7 as the playback quality 700 changes from LD 425 to MD 420 at time $T_1$. Segment 2 streams at MD 420 until time $T_2$, when ES 150B experiences congestion due to video popularity. The client monitoring module 510 reports that the target user's bandwidth has dropped to 300 Kb/s; the manifest fetch module 320 supplies the DASH software module 130 with the manifest file for the LD 425 representation on ES 150A once again. This is shown in FIG. 7 as the playback quality 700 drops from MD 420 to LD 425 at time $T_2$. Between times $T_2$ and $T_3$ (i.e. while segment 3 is streaming), the decision engine signals the CDN link update module 325 to locate an alternate edge server to host the debate coverage and balance the load across CDN 150. The CDN link update module 325 determines that ES 150C is closest in proximity to the target user, and contains adequate capacity to host the MD 420 representation of the popular video. The video is cached in ES 150C and the manifest generator 315 includes the edge server's URL in the manifest file corresponding to the MD 420 representation of the debate. The client monitoring module reports that the target user's bandwidth is again at 400 Kb/s, so the streaming system 110 provides the DASH software module 130 with the modified MD 420 manifest file. This is shown in FIG. 7 as playback quality 700 resumes MD 420 representation at time $T_3$ to stream segment 4 from host ES 150C. At time $T_4$, the target user's bandwidth increases to 5 Mb/s. Because the quality prediction model associated with the target user recommends HD 415 playback quality 700, and the client monitoring module 510 reports that target user bandwidth can now accommodate this recommendation, the decision engine 330 signals the manifest fetch module 320 to retrieve the manifest file corresponding to the HD representation of the debate. This is illustrated in FIG. 7 as the target user streams segment 5 in HD 415 playback quality 700 from time $T_4$ to $T_5$.

Figure 8A:
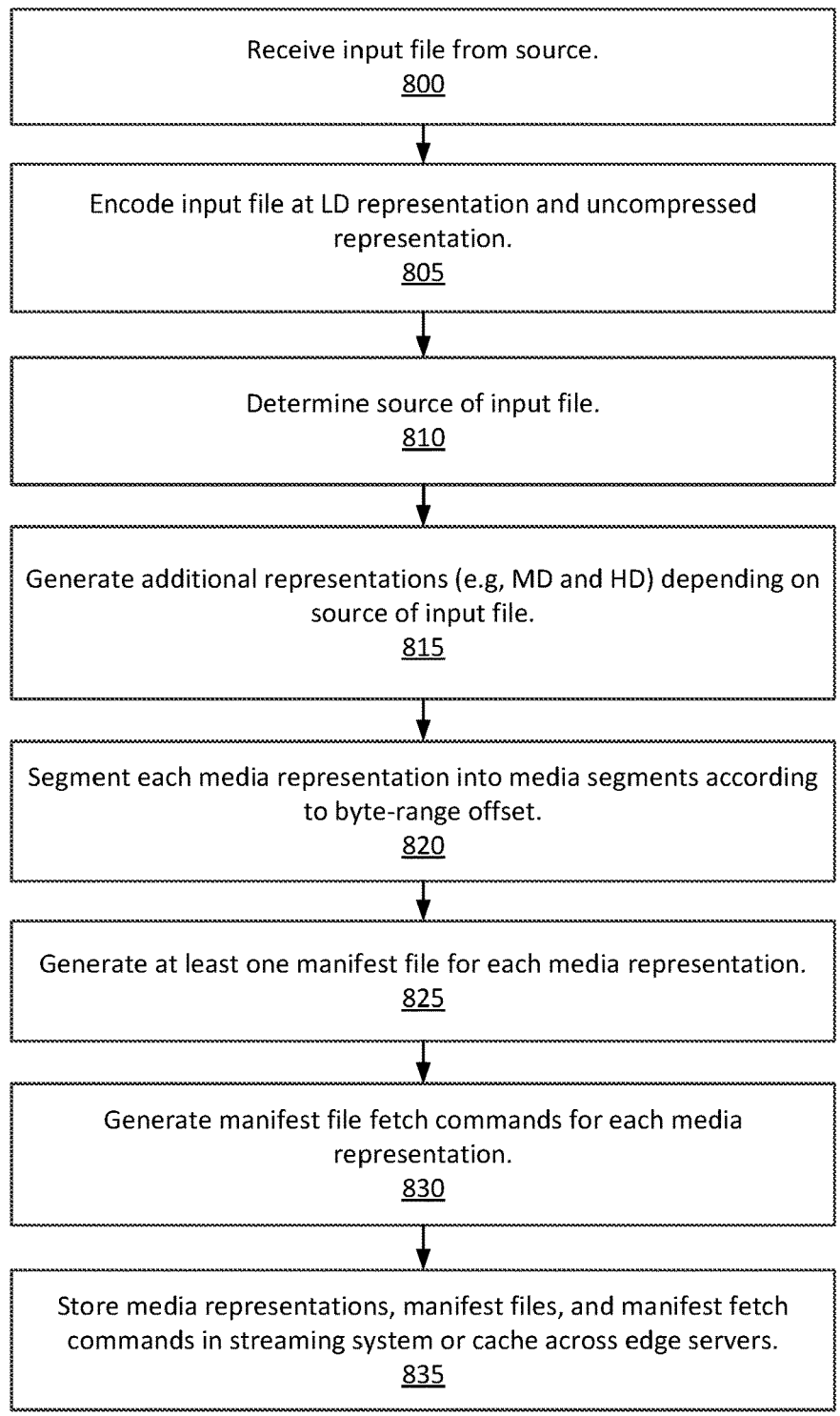
FIG. 8A is a flowchart illustrating a process for providing customized manifest files for a steaming video to a client device according to one embodiment.

FIG. 8A is a flowchart illustrating a process for generating manifest files for each representation of an input media file for streaming. The streaming system 110 receives 800 an input file 300 from a content provider, e.g., an online system 100 user, premium broadcaster, content provider, etc., and encodes 805 the input file 300 in one or more media representations, including at least an LD compressed representation. The streaming system 110 then determines 810 whether to encode additional media representations, e.g., by examining the source of the input file 300. If the source is from premium broadcasters or well-established (e.g. popular) online system 100 users, the encoder module 305 generates 815 additional representations (e.g., MD and HD) of the input file 300. The streaming system 110 segments 820 each media representation into multiple media segments according a predetermined byte-range offset, e.g., 100 KB per segment, and generates 825 a least one manifest fetch for each representation. The streaming system 110 further generates 830 manifest file fetch commands for each representation, and stores 835 the representations of the input file 300, manifest files and manifest fetch commands in the streaming system 110 or cached across edge servers (ES 150A through ES 150N) within the CDN 150.

Figure 8B:
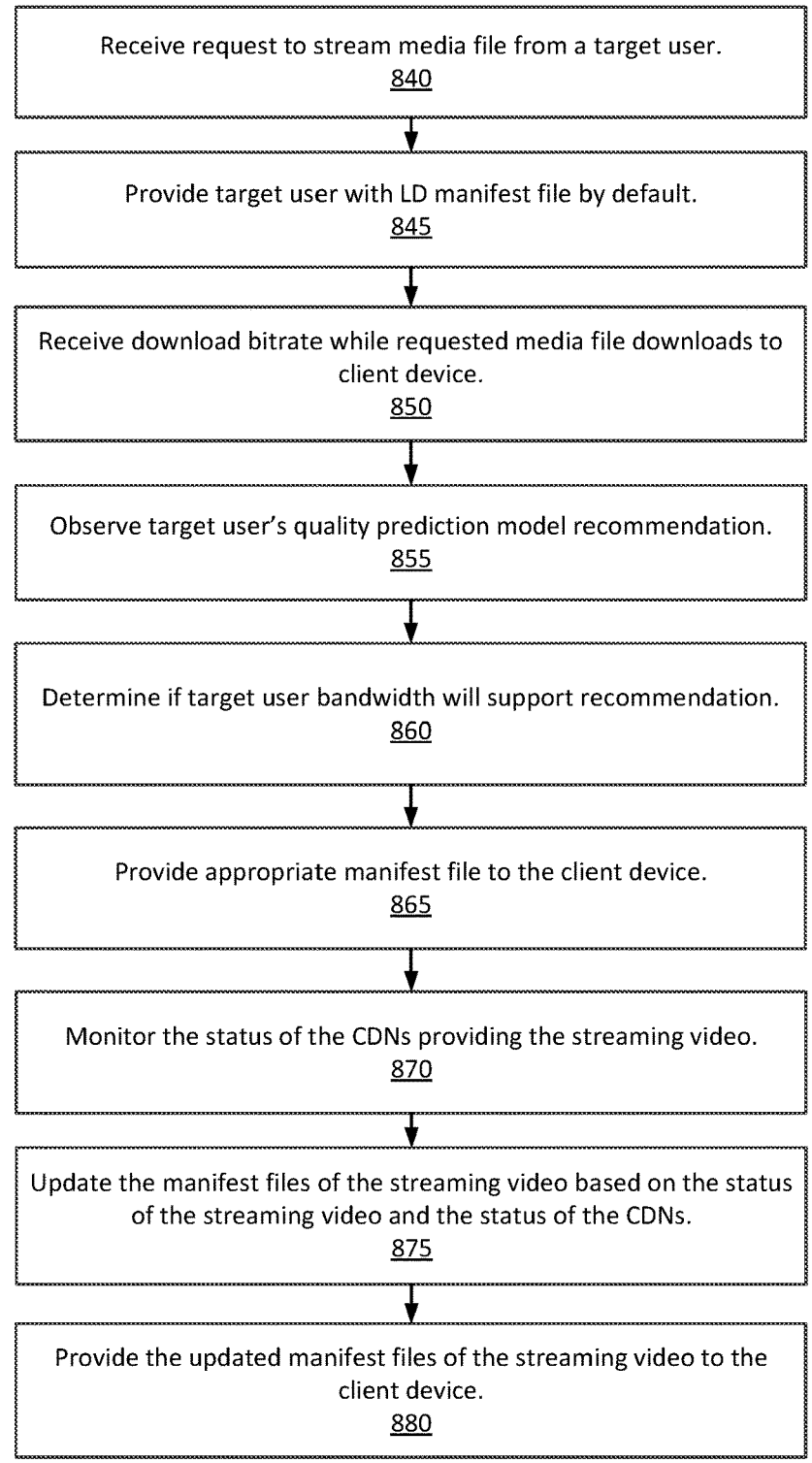
FIG. 8B is a flowchart illustrating a process for providing updated manifest files of a streaming video to a client device according to one embodiment.

FIG. 8B is a flowchart illustrating a process for providing an online system 100 user the appropriate representation of a media file for streaming based on characteristics associated with the target user and his/her client device. The streaming system 110 receives 840 a request to stream media content of a media file from a target user and provides 845 the online system 100 user with a manifest file for the LD representation of the media file by default, where the target user downloads the LD representation media file according to the corresponding manifest file. The DASH software module 130 on the target user's client device uses this manifest file to begin downloading the requested media. As the media file downloads and begins streaming on the online system 100 user's client device 120, the streaming system 110 receives 850 download information, e.g., download bitrate, and network bandwidth, from the client device 120. The streaming system 110 uses a trained quality prediction model to determine 855 which representation of the requested media file the online system 100 user is most suitable for the target user to stream. The streaming system 110 then determines 860 if the online system 100 user's bandwidth in capable of supporting a representation recommended by the trained quality prediction model. If the bandwidth is sufficient for streaming a representation in line with the quality prediction model recommendation, a manifest file pertaining to the recommended representation is provided 865 to the DASH software module 130 for streaming. However, if bandwidth is insufficient for streaming the recommended representation, the streaming system 110 provides 865 the DASH software module with the appropriate manifest file for streaming within the given bandwidth. In addition, the streaming system 110 monitors 870 the capacities of each edge server within the CDN 150. In the event that a media file within the CDN 150 becomes popular, or if an edge server malfunctions, the streaming system 110 updates 875 the manifest file associated with the requested media file if a change in edge servers is needed. The streaming system 110 then provides 880 the updated manifest file to the DASH software module 130 so that streaming may continue.

VI. General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
 receiving, from a user of an online system, a request for streaming media content of a media file;
 encoding, by the online system, the media file into one or more media representations of the media content, each of the one or more media representations of the media content describing a streaming quality of the media content;
 generating a manifest file for each of the one or more media representations of the media content, each manifest file comprising information describing a location of a media representation of the one or more media representations of the media content, and a plurality of media segments for the media representation;

analyzing a plurality of user features describing the user and conditions associated with streaming the media content to the user, the plurality of user features including a history of streaming services received by the user, the history of streaming services identifying a quality of media representation preferred by the user;

generating a customized manifest file for the media file for the user based on the analysis of the user features and conditions associated with streaming the media content to the user, the customized manifest file comprising information describing a location of a media representation of the one or more media representations having the quality of media representation preferred by the user; and providing the customized manifest file to user for streaming the media content of the media file.

2. The method of claim 1, wherein the location of the media representation of the media content includes a universal resource locator (URL) of the media content represented by the media representation provided by a content provider.

3. The method of claim 1, further comprising:
segmenting each of the one or more media representations of the media content into a plurality of media segments according to a predefined byte offset within the media representation of the media content.

4. The method of claim 1, wherein analyzing the plurality of user features describing the user and conditions associated with streaming the media content to the user comprises:
extracting the plurality of user features describing the user and conditions associated with streaming the media content to the user; and
applying a trained model to the extracted the plurality of user features and conditions associated with streaming the media content to the user.

5. The method of claim 4, further comprising:
generating a prediction identifying a media representation of the one or more media representations of the media content that is likely to be suitable for streaming given the conditions associated with streaming the media content to the user; and
selecting the media representation of the one or more media representations of the media content for the user based on the generated prediction.

6. The method of claim 5, further comprising:
segmenting the selected media representation into a plurality of media segments according to a predefined byte offset within the selected media representation; and
generating a manifest file for the selected media representation;
providing the generated manifest file for the selected media representation to the user.

7. The method of claim 4, wherein the trained model is trained on a corpus of training data using one or more machine learning schemes, the corpus of the training data being generated from a plurality of other users of the online system for receiving media streaming services provided by the online system.

8. The method of claim 1, wherein the conditions associated with streaming the media content to the user comprise at least one of the following:
network bandwidth of a client device for streaming the media content to the user;
computing power of the client device for streaming the media content to the user;
network connectivity type of the client device;
type of the client device;
resolution of a display of the client device; and
geolocation of the client device.

9. The method of claim 1, wherein the plurality of user features describing the user comprise at least one of the following:
geolocation of the user;
frequency of requests for media streaming services from the user;
history of streaming services received by the user, the history of the streaming services identifying quality of media representation in each received streaming service by the user; and
user preference for types of media content for streaming.

10. The method of claim 1, wherein the one or more media representations of the media content are supported by dynamic adaptive streaming over HTTP (DASH) streaming protocol.

11. A non-transitory computer readable storage medium having instructions encoded thereon that, when executed by a processor, cause the processor to perform the steps including:
receiving, from a user of an online system, a request for streaming media content of a media file;
encoding, by the online system, the media file into one or more media representations of the media content, each of the one or more media representations of the media content describing a streaming quality of the media content;
generating a manifest file for each of the one or more media representations of the media content, each manifest file comprising information describing a location of a media representation of the one or more media representations of the media content, and a plurality of media segments for the media representation;
analyzing a plurality of user features describing the user and conditions associated with streaming the media content to the user, the plurality of user features including a history of streaming services received by the user, the history of streaming services identifying a quality of media representation preferred by the user;
generating a customized manifest file for the media file for the user based on the analysis of the user features and conditions associated with streaming the media content to the user, the customized manifest file comprising information describing a location of a media representation of the one or more media representations having the quality of media representation preferred by the user; and
providing the customized manifest file to user for streaming the media content of the media file.

12. The non-transitory computer readable storage medium of claim 11, wherein the location of the media representation of the media content includes a universal resource locator (URL) of the media content represented by the media representation provided by a content provider.

13. The non-transitory computer readable storage medium of claim 11, further comprising:
segmenting each of the one or more media representations of the media content into a plurality of media segments according to a predefined byte offset within the media representation of the media content.

14. The non-transitory computer readable storage medium of claim 11, wherein analyzing the plurality of user features describing the user and conditions associated with streaming the media content to the user comprises:

extracting the plurality of user features describing the user and conditions associated with streaming the media content to the user; and applying a trained model to the extracted the plurality of user features and conditions associated with streaming the media content to the user.

15. The non-transitory computer readable storage medium of claim 14, further comprising:

generating a prediction identifying a media representation of the one or more media representations of the media content that is likely to be suitable for streaming given the conditions for streaming the media content to the user; and selecting the media representation of the one or more media representations of the media content for the user based on the generated prediction.

16. The non-transitory computer readable storage medium of claim 15, further comprising:

segmenting the selected media representation into a plurality of media segments according to a predefined byte offset within the selected media representation; and generating a manifest file for the selected media representation;

providing the generated manifest file for the selected media representation to the user.

17. The non-transitory computer readable storage medium of claim 14, wherein the trained model is trained on a corpus of training data using one or more machine learning schemes, the corpus of the training data being generated from a plurality of other users of the online system for receiving media streaming services provided by the online system.

18. The non-transitory computer readable storage medium of claim 11, wherein the conditions associated with streaming the media content to the user comprise at least one of the following:

network bandwidth of a client device for streaming the media content to the user;

computing power of the client device for streaming the media content to the user;

network connectivity type of the client device;

type of the client device;

resolution of a display of the client device; and geolocation of the client device.

19. The non-transitory computer readable storage medium of claim 11, wherein the plurality of user features describing the user comprise at least one of the following:

geolocation of the user;

frequency of requests for media streaming services from the user;

history of streaming services received by the user, the history of the streaming services identifying quality of media representation in each received streaming service by the user; and user preference for types of media content for streaming.

20. The non-transitory computer readable storage medium of claim 11, wherein the one or more media representations of the media content are supported by dynamic adaptive streaming over HTTP (DASH) streaming protocol.

* * * * *